(12) United States Patent
Ku et al.

(10) Patent No.: US 10,200,930 B2
(45) Date of Patent: Feb. 5, 2019

(54) METHOD AND DEVICE FOR RESELECTING CELL HAVING SAME PRIORITY

(71) Applicant: LG ELECTRONICS INC., Seoul (KR)

(72) Inventors: Gwanmo Ku, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/575,800

(22) PCT Filed: May 23, 2016

(86) PCT No.: PCT/KR2016/005417
§ 371 (c)(1),
(2) Date: Nov. 20, 2017

(87) PCT Pub. No.: WO2016/190632
PCT Pub. Date: Dec. 1, 2016

(65) Prior Publication Data
US 2018/0146409 A1    May 24, 2018

Related U.S. Application Data

(60) Provisional application No. 62/165,220, filed on May 22, 2015.

(51) Int. Cl.
*H04W 36/30* (2009.01)
*H04W 24/08* (2009.01)
(Continued)

(52) U.S. Cl.
CPC ............ *H04W 36/30* (2013.01); *H04W 24/08* (2013.01); *H04W 48/10* (2013.01); *H04W 48/20* (2013.01)

(58) Field of Classification Search
CPC ............ H04W 36/0083; H04W 48/20; H04W 36/0061; H04W 36/08; H04W 36/04;
(Continued)

(56) References Cited

U.S. PATENT DOCUMENTS

2007/0110015 A1* 5/2007 Chakraborty .......... H04B 7/022
370/338
2013/0084857 A1* 4/2013 Chen ..................... H04W 24/02
455/434
(Continued)

FOREIGN PATENT DOCUMENTS

| KR | 20100126838 | 12/2010 |
|---|---|---|
| KR | 101189881 | 10/2012 |

(Continued)

OTHER PUBLICATIONS

3GPP TS 36.304 V12.4.0, dated Mar. 2015.*
(Continued)

*Primary Examiner* — Daniel Lai
(74) *Attorney, Agent, or Firm* — Lee Hong Degerman Kang Waimey

(57) ABSTRACT

Provided are a method by which a terminal reselects a cell having the same priority in a wireless communication system, and a device for supporting the method. The terminal receives a cell-specific priority and a threshold value from a network, selects N number of cells of which the cell quality is the threshold value or more among cells having the same cell-specific priority, and can reselect a certain cell among the selected N number of cells.

14 Claims, 12 Drawing Sheets

(51) Int. Cl.
*H04W 48/10* (2009.01)
*H04W 48/20* (2009.01)
(58) Field of Classification Search
CPC ............ H04W 36/0094; H04W 28/08; H04W 36/0016; H04W 36/165; H04W 36/24; H04W 36/14; H04W 36/30; H04W 24/08; H04W 48/10
See application file for complete search history.

(56) References Cited

U.S. PATENT DOCUMENTS

| | | | |
|---|---|---|---|
| 2015/0382254 A1* | 12/2015 | Pakniat | H04W 48/12 370/331 |
| 2016/0044539 A1* | 2/2016 | Yiu | H04W 36/26 370/235 |
| 2016/0360452 A1* | 12/2016 | Koorapaty | H04J 11/0069 |

FOREIGN PATENT DOCUMENTS

| WO | 2014038910 | 3/2014 |
|---|---|---|
| WO | 2014098386 | 6/2014 |
| WO | 2015069064 | 5/2015 |

OTHER PUBLICATIONS

TS 36.304 and 3GPP TS 36.133 V12.6.0, p. 41-51 dated Dec. 2014.*
PCT International Application No. PCT/KR2016/005417, Written Opinion of the International Searching Authority dated Aug. 9, 2016, 35 pages.

* cited by examiner

METHOD AND DEVICE FOR RESELECTING CELL HAVING SAME PRIORITY

CROSS-REFERENCE TO RELATED APPLICATIONS

This application is the National Stage filing under 35 U.S.C. 371 of International Application No. PCT/KR2016/005417, filed on May 23, 2016, which claims the benefit of U.S. Provisional Application No. 62/165,220, filed on May 22, 2015, the contents of which are all hereby incorporated by reference herein in its entirety.

BACKGROUND OF THE INVENTION

Field of the Invention

The present invention relates to a wireless communication system, and more particularly to, a method for reselecting, by a user equipment (UE), a cell having the same priority in a wireless communication system, and a device supporting the same.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In a wireless communication system, when a UE moves from one cell to another cell and performs cell selection/reselection and handover, the UE should measure the strength and quality of signals of neighboring cells. In order to measure the strength and quality of such signals, the UE measures the reference signal received power (RSRP) and the reference signal received quality (RSRQ) for the reference signal in the LTE system. The UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

SUMMARY OF THE INVENTION

A cell reselection method considering cell-specific priority is proposed in order to solve a problem that may occur when cell reselection is performed based on frequency-specific priority in a heterogeneous network environment. However, when cell reselection is performed based on cell-specific priority in the heterogeneous network environment, it may be difficult to solve the concentration of loads on a particular cell or it may be impossible to consider the quality of a cell. One embodiment of the present invention proposes an improved load distribution mechanism based on cell-specific priority.

According to one embodiment, there is provided a method for reselecting, by a UE, a cell having the same priority in a wireless communication system. The UE may include: receiving cell-specific priorities and a threshold from a network; selecting N cells having a cell quality of the threshold or higher among cells having the same cell-specific priority; and reselecting any one among the N selected cells.

The N cells may be N cells having a high ranking.

N may be set by the UE.

N may be set by the network.

The cell quality may be RSRP, and the threshold may be an RSRP threshold.

The threshold may be set for each cell.

The threshold may be set for each frequency.

The cells having the same cell-specific priority may be cells having the same cell-specific priority among cells having the highest cell-specific priority.

The cell-specific priorities and the threshold may be broadcast by the network

According to another embodiment, there is provided a UE reselecting a cell having the same priority in a wireless communication system. The UE may include: a memory; a transceiver; and a processor to connect the memory and the transceiver, wherein the processor may be configured to: control the transceiver to receive cell-specific priorities and a threshold from a network; select N cells having a cell quality of the threshold or higher among cells having the same cell-specific priority; and reselect any one among the N selected cells.

The N cells may be N cells having a high ranking.

By considering cell-specific priority, a service disorder caused by the concentration of loads on a particular cell may be prevented.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
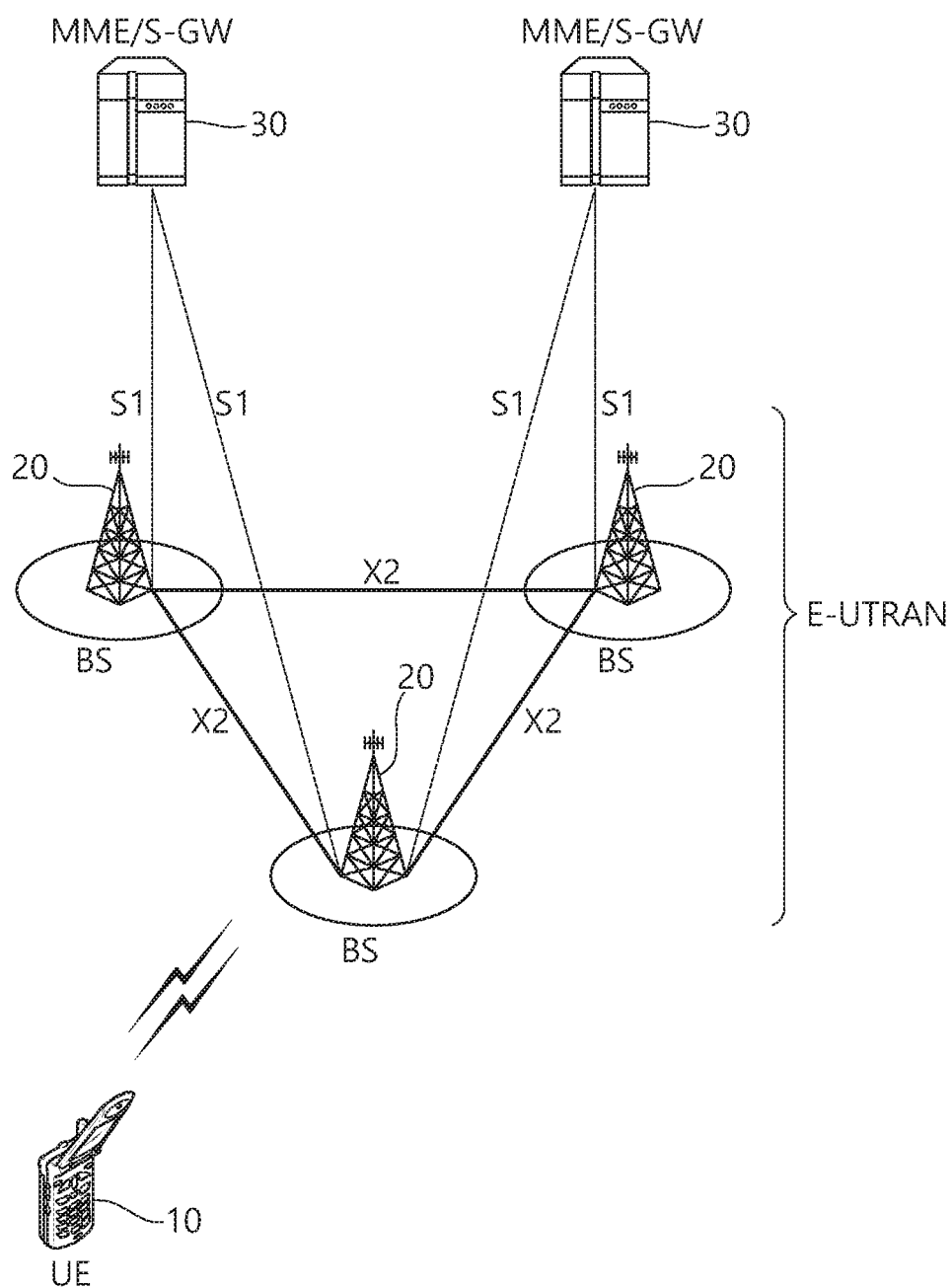
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

An E-UTRAN includes a base station (BS) 20 that provides a control plane and a user plane to a user equipment (UE) 10. The UE 10 may be fixed or mobile, and may be referred to by other name, such as a mobile station (MS), a user terminal (UT), User, a user equipment (UE), a subscriber station (SS), a wireless device, or the like. The BS 20 generally refers to a fixed station that communicates with the UE 10 and may be called by other name, such as an eNB (evolved-Node B), a BTS (Base Transceiver System), an access point, or the like.

The BSs 20 may be connected with each other via an X2 interface. The BS 20 is connected to an EPC (Evolved Packet Core) 30 via an S1 interface. Specifically, the BSs 20 are connected to an MME (Mobility Management Entity) via S1-MME and to an S-GW (Serving Gateway) via S1-U.

The EPC 30 includes an MME, an S-GW, and a P-GW (Packet Data Network-Gateway). The MME retains information regarding a UE access or information regarding UE capability, and such information is largely used to manage UE mobility. The S-GW is a gateway having an E-UTRAN as a terminal point and the P-GW is a gateway having a PDN as a terminal point.

Layers of the radio interface protocols between a UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an RRC (Radio Resource Control) layer positioned in the third layer serves to control radio resources between the UE and the network. To this end, the RRC layer exchanges an RRC message between the UE and the network.

Figure 2:
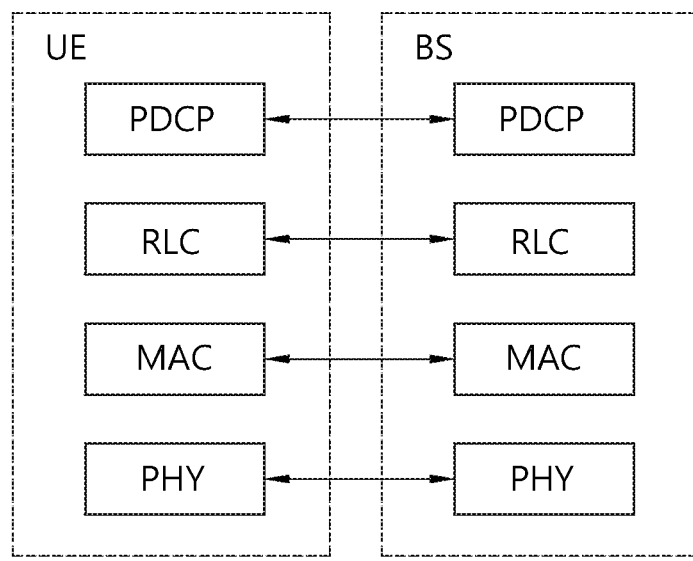
FIG. 2 shows a radio protocol architecture with respect to a user plane.
Figure 3:
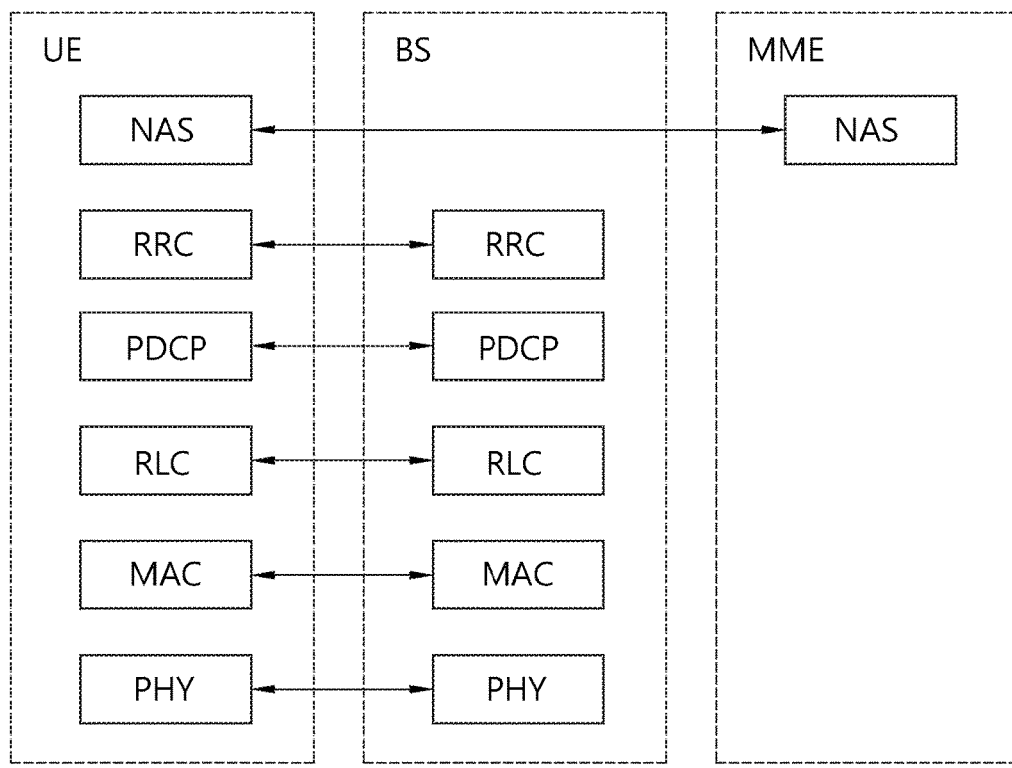
FIG. 3 shows a radio protocol architecture with respect to a control plane.

FIG. 2 shows a radio protocol architecture with respect to a user plane. FIG. 3 show a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel. Transport channels are classified depending on how and with what kind of characteristics data is transmitted through a radio interface.

Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

The RRC (Radio Resource Control) layer is defined only in the control plane. The RRC layer handles controlling of a logical channel, a transport channel, and a physical channel in relation to configuration, re-configuration, and releasing of radio bearers (RBs). RB refers to a logical path provided by the first layer (PHY layer) and the second layers (MAC layer, RLC layer, and PDCP layer) to transfer data between a UE and a network.

A PDCP (Packet Data Convergence Protocol) layer in the user plane performs a transfer of a user data, header compression, and ciphering. Functions of the PDCP in the control plane include transfer of control plane data and ciphering/integrity protection.

Setting of an RB refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC of the UE and that of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, an RRC state and an RRC connection method will be described.

An RRC state refers to whether or not an RRC layer of a UE is logically connected to that of the E-UTRAN. When the RRC layer of the UE is logically connected to that of the E-UTRAN, it is called an RRC connected state, and or otherwise, it is called an RRC idle state. When the UE is in the RRC connected state, since the RRC connection exists, the E-UTRAN can recognize the presence of the corresponding UE by cell, and thus, the E-UTRAN can effectively control the UE. Meanwhile, when the UE is in the RRC idle state, the E-UTRAN cannot recognize the UE in the RRC idle state, and the UE is managed by a core network (CN) by track area unit larger than a cell. Namely, the UE in the RRC idle state is recognized as to whether or not it is present by the larger area unit, and in order for the UE in the RRC idle state to receive a general mobile communication service such as a voice or data, the UE in the RRC idle state is to be changed to the RRC connected state.

When the user first turns on power of a UE, the UE first searches for an appropriate cell and remains in an RRC idle state in the corresponding cell. When the UE in the RRC idle state is required to be RRC connected, the UE establishes an RRC connection with the E-UTRAN through an RRC connection procedure and transitions to the RRC connection state. When the UE in the RRC idle state may need to establish an RRC connection for various reasons. For example, the UE in the RRC idle state may establish an RRC connection when a transmission of uplink data is required as the user attempts to make a call, or the like, or when a response is required to be transmitted as a paging message is received from the E-UTRAN.

A NAS (Non-Access Stratum) layer positioned at a higher level of the RRC layer performs functions such as session management, mobility management, and the like.

In order for the NAS layer to manage mobility of the UE, two states of EMM-REGISTERED (EPS Mobility Management-REGISTERED) and EMM-DEREGISTERED are defined, and these two states are applied to a UE and an MME. Initially, the UE is in the EMM-DEREGISTERED state, and in order to access a network, the UE performs a process of registering the corresponding network through an initial attach procedure. When the attach procedure is successfully performed, the UE and the MME are in the EMM-REGISTERED state.

In order to manage a signaling connection between the UE and the EPC, two states of ECM (EPS Connection Management)-IDLE and an ECM-CONNECTED state are defined, and these two states are applied to the UE and the MME. When the UE in the ECM-IDLE state establishes an RRC connection with the E-UTRAN, the corresponding UE is in the ECM-CONNECTED state. When the MME in the ECM-IDLE state establishes an S1 connection with the E-UTRAN, the MME is in an ECM-CONNECTED state. When the UE is in the ECM-IDLE state, the E-UTRAN does not have information regarding context of the UE. Thus, the UE in the ECM-IDLE state performs a UE-based mobility related procedure such as cell selection or cell reselection without receiving a command of the network. Meanwhile, when the UE is in the ECM-CONNECTED state, mobility of the UE is managed by a command of the network. In the ECM-IDLE state, when a location of the UE is changed to be different from that known by the network, the UE informs the network about its location through a tracking area updating procedure.

Figure 4:
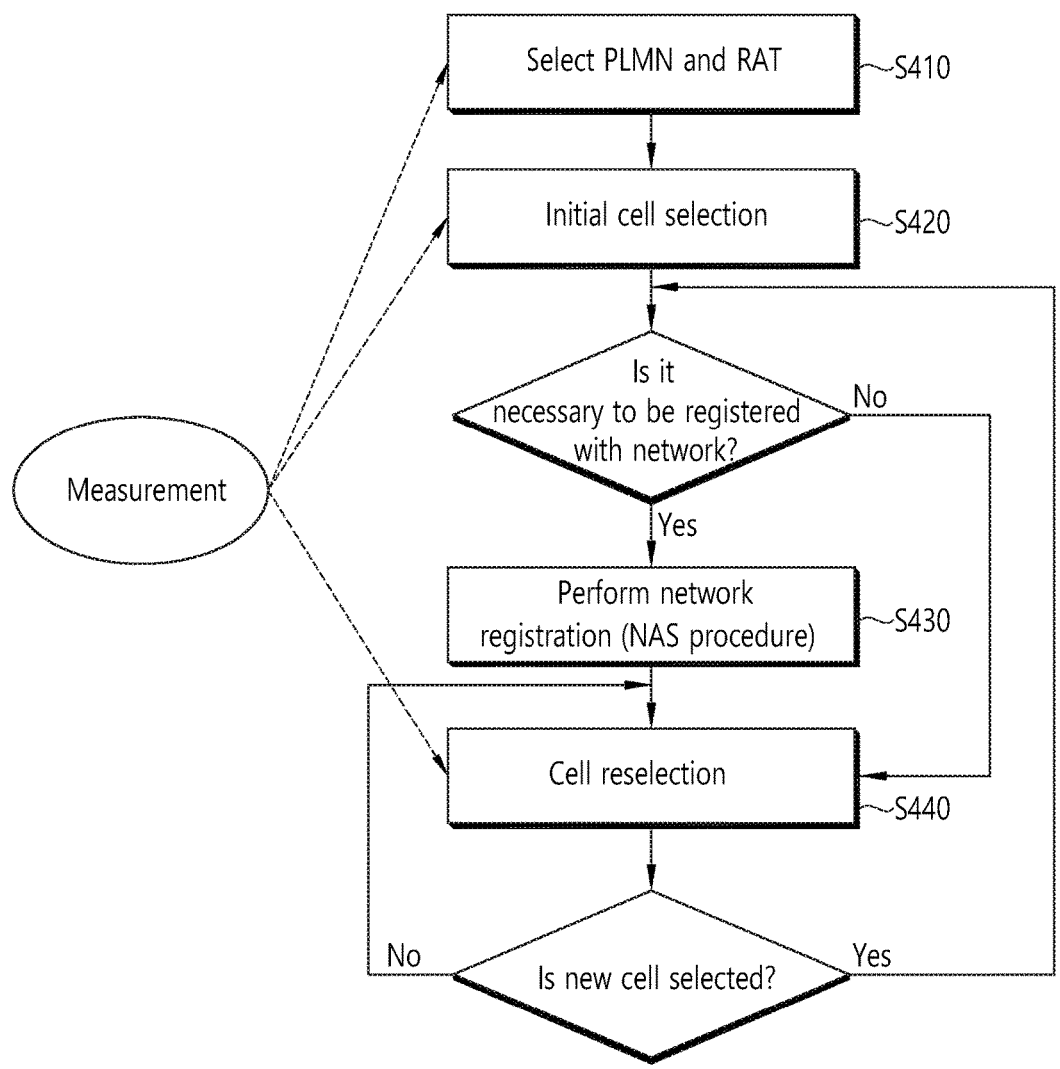
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
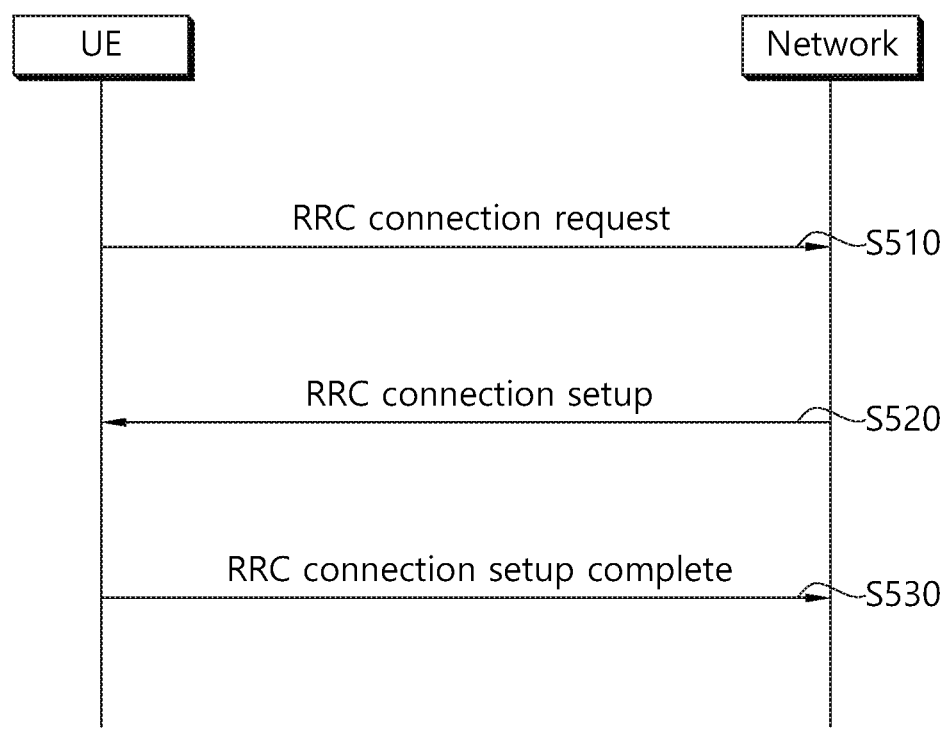
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
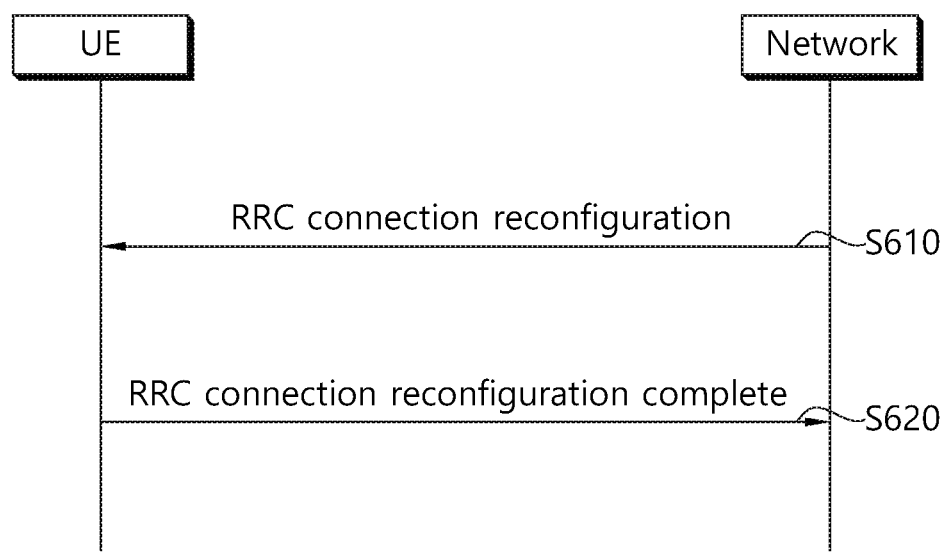
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a UE.

When power is turned-on or the UE is located in a cell, the UE performs procedures for receiving a service by selecting/reselecting a suitable quality cell.

A UE in an RRC idle state should prepare to receive a service through the cell by always selecting a suitable quality cell. For example, a UE where power is turned-on just before should select the suitable quality cell to be registered in a network. If the UE in an RRC connection state enters an RRC idle state, the UE should selects a cell for stay in the RRC idle state. In this way, a procedure of selecting a cell satisfying a certain condition by the UE in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the UE.

Hereinafter, a method and a procedure of selecting a cell by a UE in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each UE set by a network may refer to a dedicated priority. If receiving the dedicated priority, the UE may receive a valid time associated with the dedicated priority together. If receiving the dedicated priority, the UE starts a validity timer set as the received valid time together therewith. While the valid timer is operated, the UE applies the dedicated priority in the RRC idle mode. If the valid timer is expired, the UE discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S Q_{meas,s} + Q_{hyst}, R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
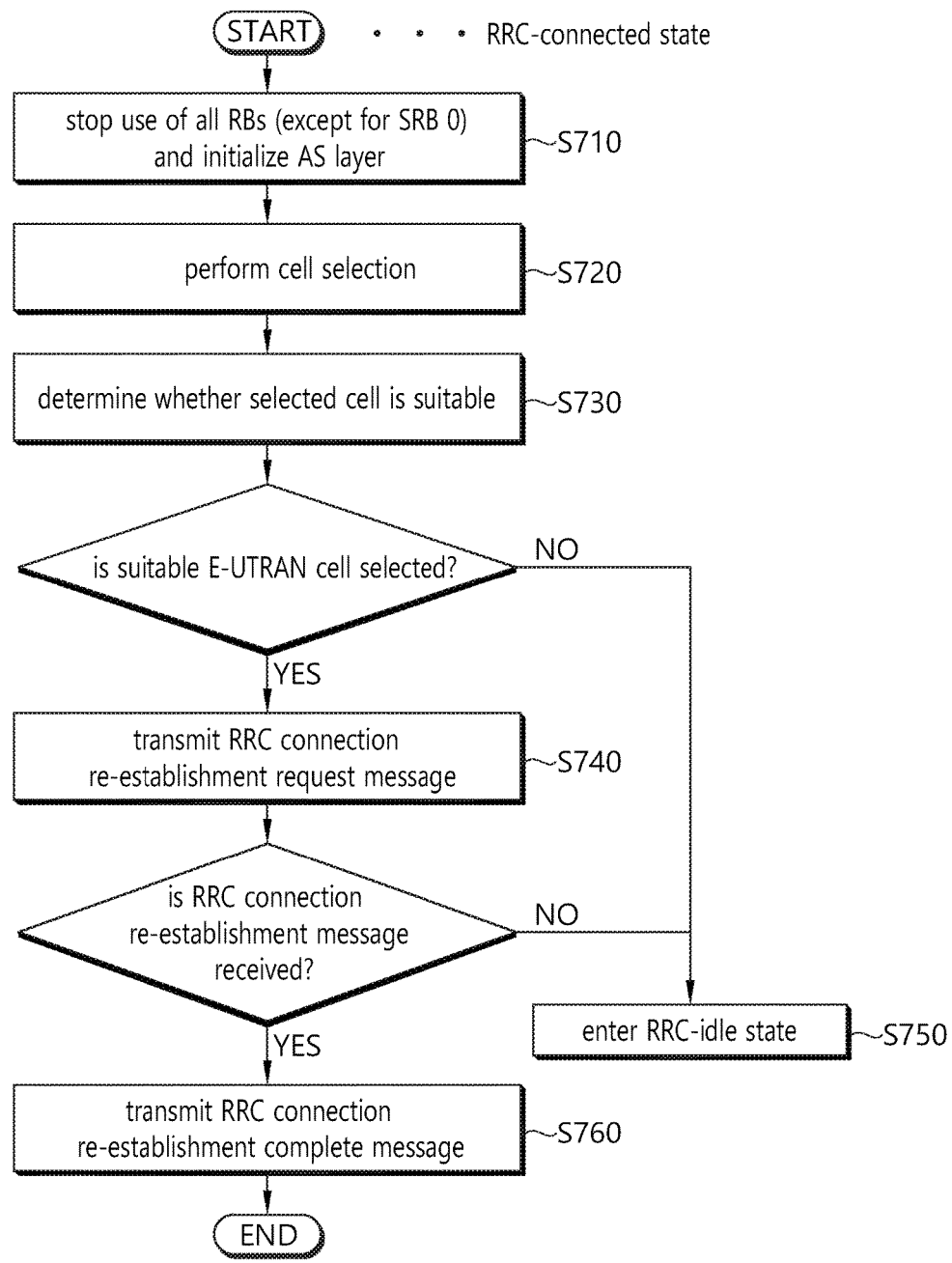
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
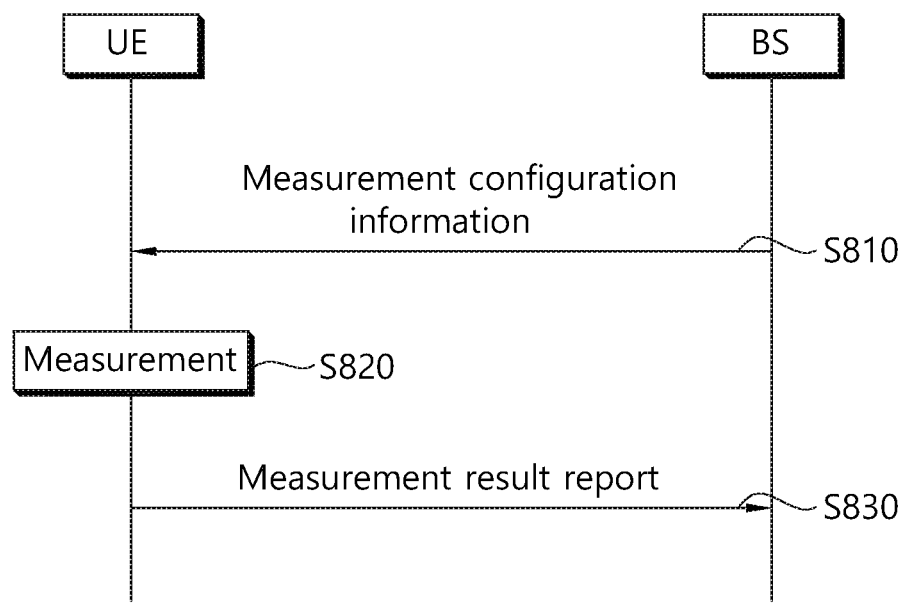
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

Figure 9:
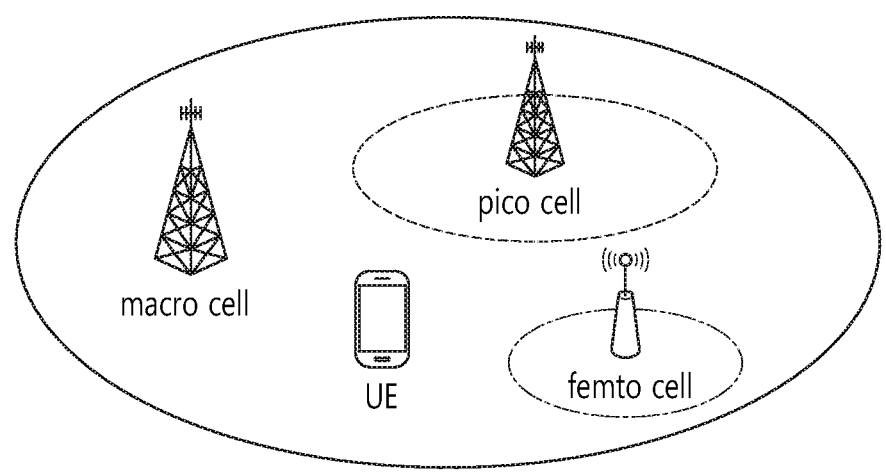
FIG. 9 illustrates an example of a heterogeneous network.

FIG. 9 illustrates an example of a heterogeneous network (HetNet).

Referring to FIG. 9, the heterogeneous network is a network in which different types of cells are mixed and operated. There are many nodes overlapping in the heterogeneous network, which may include a picocell, a microcell, a femtocell or a home BS (eNB). Although the use of small cells is not limited, a picocell may generally be installed in an area with high demand for data services, a femtocell may be installed in an indoor office or home, and a wireless repeater may be installed for supplementing macrocell coverage. Small cells may be classified into a closed subscriber group (CSG) available only to a particular user according to access restriction, an open access group that general users are allowed to access, and a hybrid access group that is a combination of these two types.

Figure 10:
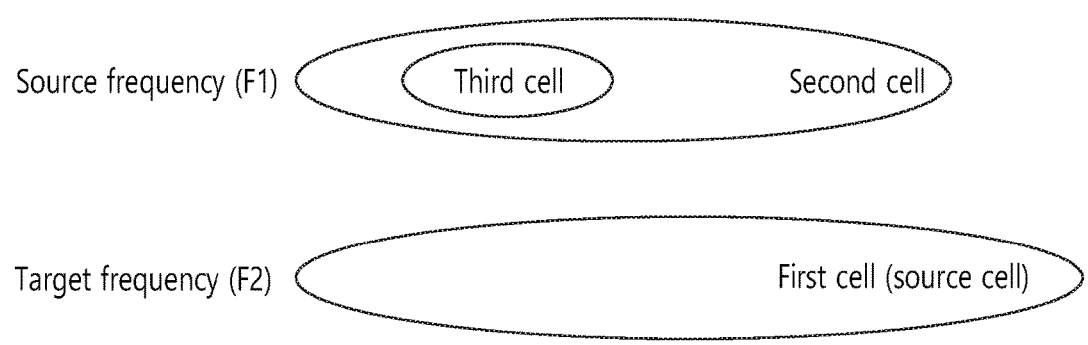
FIG. 10 illustrates a problem that may occur when cell (re)selection is performed based on frequency priority in a heterogeneous network environment.

FIG. 10 illustrates a problem that may occur when cell (re)selection is performed based on frequency priority in a heterogeneous network environment.

Generally, a UE in an idle mode measures the signal level of a cell on a current frequency and also measures the signal level of a cell on another RAT or another frequency. Different frequencies and different RATs can be assigned different priorities. Such priorities may be provided to the UE as part of system information (SIB). Alternatively, such priorities may be provided to the UE via an RRC connection release message. It is assumed that the UE in the idle mode may follow these priorities when performing measurement for cell selection or reselection.

Measurement on a frequency/RAT with high priority is always performed.

Measurement on a frequency/RAT with low priority may be performed only when the signal level of a current serving cell is lower than a defined threshold (threshServingLow). When multiple cells with the same priority are found on a frequency, a cell having the highest signal level in view of a set offset and hysteresis may be selected.

Referring to FIG. 10, it is assumed that a first cell and a second cell are macrocells and a third cell is a small cell located at the same frequency as the second cell in order to provide additional capacity in the coverage. It is assumed that F1 denotes a source frequency, and F2 denotes a target frequency. It is assumed that the UE is camping on the first cell.

In this scenario, the third cell may have very small coverage. Considering frequency-specific priority, it is required not only to relocate a UE that is positioned both in the coverage of the third cell and in the coverage of the first cell but also to relocate a UE that is positioned outside the coverage of the third cell but is positioned in the coverage of the first cell. Thus, it may be difficult to fully utilize the capacity of the third cell by offloading the loads of the first cell and the second cell to the third cell. In order to solve such a problem, a conventional method of providing cell-specific priority to a UE has been proposed.

Table 2 shows an illustrative configuration of cell-specific priorities.

TABLE 2

| | Cell-specific priority of first cell (F1) | Cell-specific priority of second cell (F2) | Cell-specific priority of third cell (F2) |
|---|---|---|---|
| F1 | 5 | 4 | 4 |
| F2 | 4 | 5 | 5 |

This configuration may mean that in the idle mode, the frequency of a current serving cell (first cell) has higher priority than another frequency. Thus, the UE may continue to camp on the current location and may not perform measurement on a frequency with lower priority until the signal level of the serving cell becomes lower than the defined threshold.

Table 3 shows an illustrative reconfiguration of cell-specific priorities.

TABLE 3

| | Cell-specific priority of first cell (F1) | Cell-specific priority of second cell (F2) | Cell-specific priority of third cell (F2) |
|---|---|---|---|
| F1 | 5 | 4 | 4 |
| F2 | 4 + (third cell: 6) | 5 | 5 |

That is, the third cell may be assigned higher priority than the first cell. With the above configuration, the third cell (F2) can attract the UE in the idle mode camping on the first cell (F1). A static UE in the coverage of the third cell or a UE that slowly roams in the coverage of the third cell may be highly likely to be relocated.

When cell-specific priority is taken into consideration, it is possible to minimize a disadvantage of load distribution between the first cell and the second cell and to increase the available capacity of the third cell. However, when cell-specific priority is considered, different problems may occur, which will be described in detail below.

When a load distribution mechanism based on cell-specific priority (CSP) is configured in a network, the network needs to broadcast cell-specific priorities. When a UE receives the cell-specific priorities, the UE may need to start the load distribution mechanism based on the received cell-specific priorities. However, the load distribution mechanism based on cell-specific priority may have limitations in heterogeneous network scenarios.

When load distribution is applied to cells having the same priority, the mechanism based on cell-specific priority may not guarantee that the UEs are partially distributed among different cells. That is, in the scenario of FIG. 10, when the mechanism based on cell-specific priority is applied, it is possible to increase available capacity by concentrating loads on the third cell. However, when heavy loads are concentrated on the third cell and thus need to be distributed, it may be impossible to solve the concentration of loads using the mechanism.

It may be necessary to offload UEs to a particular cell in a heterogeneous network environment. Also, it may be necessary to ban UEs from the particular cell. The particular cell may be a small cell existing in the heterogeneous network environment. Further, it may be necessary to reselect a cell with the same priority in a heterogeneous network environment. Hereinafter, one embodiment of the present invention proposes an improved load distribution mechanism based on cell-specific priority (hereinafter, referred to as a CSP mechanism).

According to one embodiment of the present invention, when a UE supports a CSP mechanism, it may be possible to control load distribution between individual cells as compared to the case of supporting only a carrier level. When a CSP mechanism is configured for each of offloading, a ban, and reselection of a cell with the same priority, the UE may need to perform a cell reselection procedure in the network in each case. Hereinafter, offloading, a ban, and reselection of a cell with the same priority using a CSP mechanism will be described in detail according to one embodiment of the present invention.

1. Offloading UE to Particular Cell in Heterogeneous Network Scenario

According to one embodiment of the present invention, to assign the highest priority for a particular cell and to offload all UEs to the particular cell, a CSP mechanism may be performed as follows. The particular cell may be a small cell.

(1) A network may broadcast cell-specific priorities on a cell list. The cell list may be associated with particular priority. For example, cell 1 may have broadcast priority 1; cell 2 may have broadcast priority 2; cell 4 may have broadcast priority 4; cell 5 may have broadcast priority 5; and cell 6 may have broadcast priority 6. Meanwhile, cell 3 may be included in the cell list, but priority thereof may not be broadcast.

(2) When a UE receives the cell-specific priorities, the UE may check the priorities in order to determine which cell to use for a particular purpose. The particular purpose may be offloading.

When the cell-specific priority of a cell included in the cell list is signaled, the UE may consider that the cell has the signaled priority. On the other hand, when the cell-specific priority of a cell included in the cell list is not explicitly signaled, the UE may consider that the cell has the highest priority. That is, the cell may be considered to have higher priority than signaled priority. For example, since cell 3 is included in the cell list but priority thereof is not broadcasted, the UE may consider cell 3 to have the highest priority.

(3) The UE may perform a cell reselection procedure based on the considered cell-specific priorities.

2. UE Operation for Banning

According to one embodiment of the present invention, to assign the lowest priority for a particular cell and to ban all UEs from the particular cell, a CSP mechanism may be performed as follows.

(1) A network may broadcast cell-specific priorities including the lowest priority for the banned particular cell. Alternatively, the network may broadcast indicators including an indicator for the banned particular cell. For example, cell 1 may have broadcast priority 1; cell 2 may have broadcast priority 2; cell 4 may have broadcast priority 4; cell 5 may have broadcast priority 5; and cell 6 may have broadcast priority 6. Meanwhile, cell 3 may have an indicator. Alternatively, cell 3 may have particular priority associated with the lowest priority.

(2) When a UE receives the cell-specific priorities, the UE may check the priorities in order to determine which cell is banned. Alternatively, when the UE receives the indicators, the UE may check the indicators in order to determine which cell is banned.

(3) The UE may perform a cell reselection procedure based on the cell-specific priorities.

3. Reselection of Cell with Same Priority

According to one embodiment of the present invention, a cell having high signal strength may be reselected by setting a cell-specific threshold for cells having the same priority. The cell having high signal strength may be a cell having a predefined threshold or higher. A CSP mechanism may be performed for cells having the same priority as follows.

(1) A network may transmit cell-specific priorities and a threshold to a UE. Alternatively, the network may broadcast the cell-specific priorities and the threshold to the UE.

(2) When the UE receives the cell-specific priorities and the threshold, the UE may need to reselect a cell. To reselect a cell among the cells having the same priority, the UE may perform a cell reselection procedure as follows.

1) The UE may consider the rankings of cells calculated by Equation 1. For example, the UE may consider the calculated rankings of the cells having the same priority. The cells having the same priority may be cells having the same cell-specific priority among cells having the highest cell-specific priority.

2) The UE may select a cell that satisfies a specific criterion. The cell satisfying the specific criterion may include N cells having a high ranking. Alternatively, the cell satisfying the specific criterion may be a cell having a signal strength of the threshold or higher. Alternatively, the cell satisfying the specific criterion may be a cell having a signal strength of the threshold or higher among N cells having a high ranking. Alternatively, the cells satisfying the specific criterion may include N cells having a high ranking among cells having a signal strength of the threshold or higher. N may be set by the UE. Alternatively, N may be set by the network. The signal strength may be RSRP. The threshold may be set for each frequency. Alternatively, the threshold may be set for each cell.

3) The UE may perform a cell reselection procedure by selecting one of cells satisfying the specific criterion.

Figure 11:
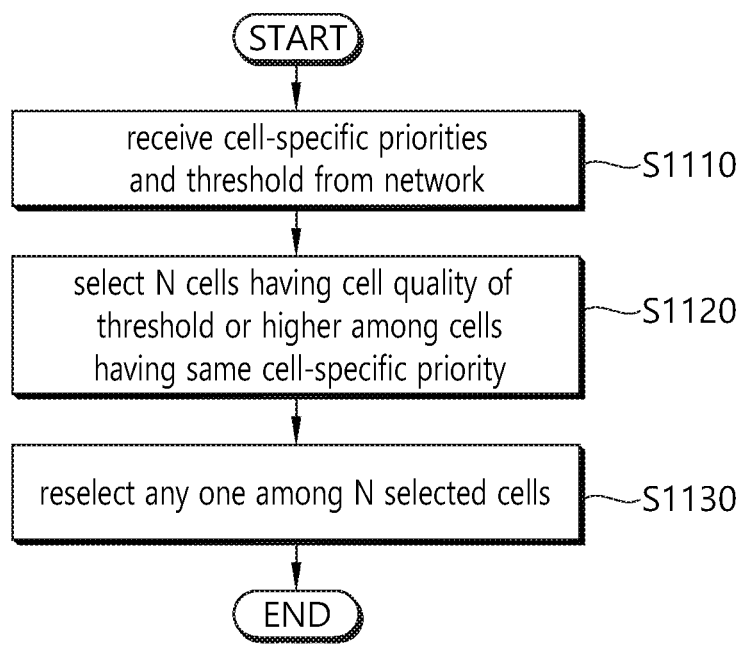
FIG. 11 is a block diagram illustrating a method for reselecting, by a user equipment, a cell having the same priority according to one embodiment of the present invention.

FIG. 11 is a block diagram illustrating a method for reselecting, by a UE, a cell having the same priority according to one embodiment of the present invention.

Referring to FIG. 11, the UE may receive cell-specific priorities and a threshold from a network (S1110). N cells may be N cells having a high ranking. N may be set by the UE. N may be set by the network. The threshold may be an RSRP threshold. The threshold may be set for each cell. The threshold may be set for each frequency. The cell-specific priorities and the threshold may be broadcast by the network.

The UE may select N cells having a cell quality of the threshold or higher among cells having the same cell-specific priority (S120). The cells having the same cell-specific priority may be cells having the same cell-specific priority among cells having the highest cell-specific priority. The cell quality may be RSRP.

The UE may reselect any one among the N selected cells (S1130).

Figure 12:
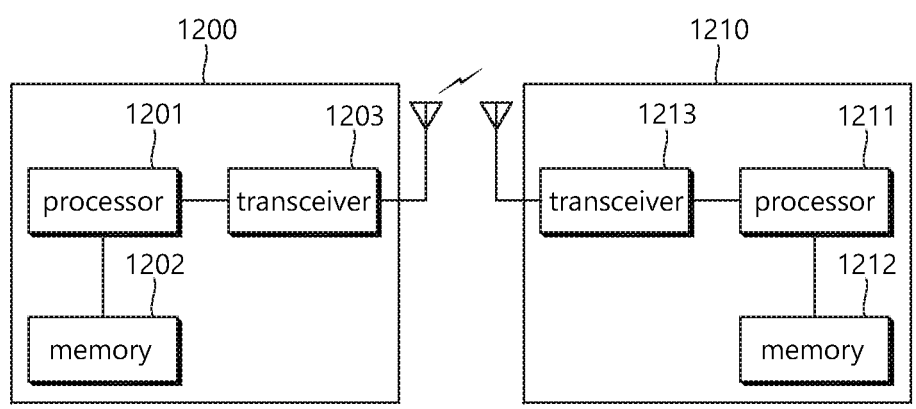
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for reselecting a cell among cells having a same cell-specific priority in a wireless communication system, the method performed by a user equipment (UE) and comprising:

receiving cell-specific priorities and a threshold from a network;

selecting N cells having a cell quality of the threshold or higher from the cells having the same cell-specific priority; and reselecting any one cell from the N selected cells;

wherein N is a positive integer, and wherein N is set by the UE.

2. The method of claim 1, wherein the N cells have a high ranking.

3. The method of claim 2, wherein:
the cell quality is RSRP;
the threshold is an RSRP threshold.

4. The method of claim 2, wherein the threshold is set for each cell.

5. The method of claim 2, wherein the threshold is set for each frequency.

6. The method of claim 1, wherein the cells having the same cell-specific priority are cells among cells having a highest cell-specific priority.

7. The method of claim 1, wherein the cell-specific priorities and the threshold are received via a broadcast from the network.

8. A user equipment (UE) reselecting a cell among cells having a same cell-specific priority in a wireless communication system, the UE comprising:

a memory configured to store information;

a transceiver configured to receive information; and a processor connected to the memory and the transceiver and configured to:

control the transceiver to receive cell-specific priorities and a threshold from a network;

select N cells having a cell quality of the threshold or higher from the cells having the same cell-specific priority;

reselect any one cell from the N selected cells, wherein N is a positive integer, and
wherein N is set by the UE.

9. The UE of claim 8, wherein the N cells have a high ranking.

10. The UE of claim 8, wherein:
the cell quality is RSRP;
the threshold is an RSRP threshold.

11. The UE of claim 8, wherein the threshold is set for each cell.

12. The UE of claim 8, wherein the threshold is set for each frequency.

13. The UE of claim 8, wherein the cells having the same cell-specific priority are cells having a highest cell-specific priority.

14. The UE of claim 8, wherein the cell-specific priorities and the threshold are received via a broadcast from the network.

* * * * *